(No Model.)

W. W. KNOWLTON.
METHOD OF MAKING METALLIC RAKES AND FORKS.

No. 281,634. Patented July 17, 1883.

WITNESSES
Chas. R. Burr
W. E. Bowen

INVENTOR
William W. Knowlton
per Edson Bros.
ATTORNEYS

![United States Patent Office.]

WILLIAM W. KNOWLTON, OF ASHTABULA, OHIO, ASSIGNOR OF THREE-FOURTHS TO SAMUEL R. HARRIS AND LUCIEN K. SHAYLOR, OF SAME PLACE.

METHOD OF MAKING METALLIC RAKES AND FORKS.

SPECIFICATION forming part of Letters Patent No. 281,634, dated July 17, 1883.

Application filed February 20, 1883. (No model.)

*To all whom it may concern:*

Be it known that I, WILLIAM W. KNOWLTON, a citizen of the United States, residing at Ashtabula, in the county of Ashtabula and State of Ohio, have invented certain new and useful Improvements in the Manufacture of Rakes and Forks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention pertains to an improvement in the manufacture of garden or agricultural forks or rakes, having for its object to produce from a single piece of metal or steel a rake with braces or shank extending from the head thereof flush with the top edge of the latter, or a fork with its shanks or braces caused to stand upwardly from its top edge; and it consists in forming a blank right-angled in cross-section and cutting out a piece from the center of the intended shank portion of the blank, the latter being further cut from or to a point a short distance from and on each side of the former cut, when the two arms thus formed are bent and "drawn out" and welded together at their outer ends, converting them into shanks or braces, with a forwardly-projecting tang for the attachment of the handle. The teeth are now formed by cutting the other portion of the blank at intervals, "drawing out," shaping, and pointing the teeth, all as hereinafter more fully set forth and claimed.

Figure 1:
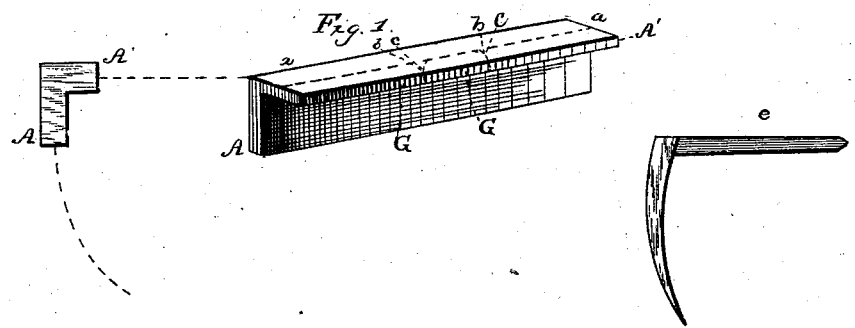
Figure 2:
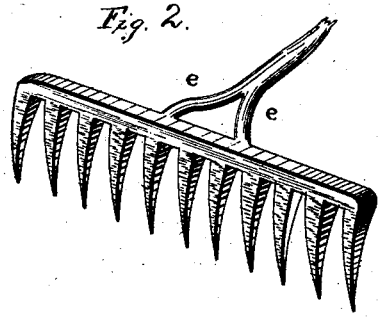
Figure 3:
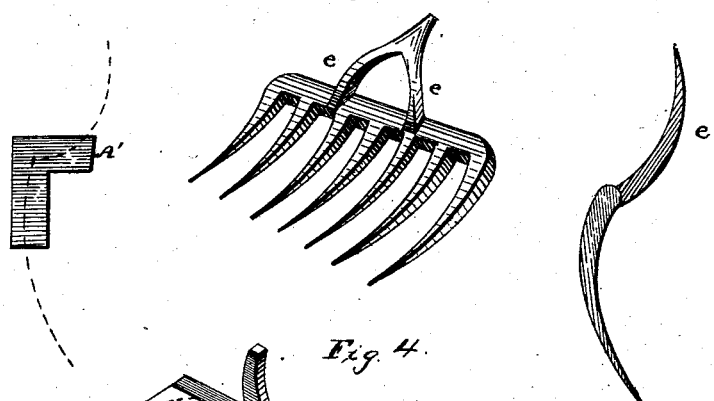
Figure 4:
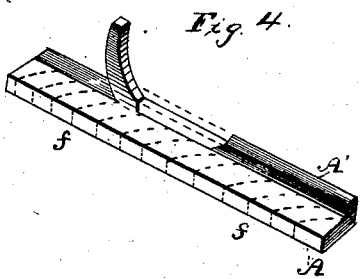

In the accompanying drawings, Figure 1 is a perspective view and a side view of a blank in different stages of treatment and a side view of a rake produced by my process. Fig. 2 is a perspective view of a completed rake. Fig. 3 is a similar view of a fork, a side view of its blank, and a similar view of the blank in a certain stage of its process. Fig. 4 is a perspective view of a blank with the central and a side portion of its right-angled top portion removed, and a prospective shank portion bent up, the dotted lines indicating the intended cutting of the blank to form the teeth.

In carrying out my invention I first cut a piece of steel so as to form a blank, A, triangular in cross-section, as seen in the left-hand view of Fig. 1, and of a greater thickness than that of the intended rake, it being reduced in thickness, as shown in the main or middle view of the same figure. The next step is to cut a piece out of the middle of its right-angled top portion, A', at G G, and as clearly seen in Fig. 4, and then to cut from each end of the same portion of the blank, commencing at *a a*, to *b b*, a short distance from each side of the middle cut; or this cutting of the blank may be reversed by cutting from the points *b b* to the ends *a a*—i. e., from an inner point outwardly. The blank thus treated will be provided with two strips or pieces, each of a thickness at its inner end equal to the distance between *b* and *c*. These strips or pieces are bent up, as exhibited by the bent one in Fig. 4, and then drawn out and welded together, as seen either in Fig. 2 or 3, to form braces *e e*. In Fig. 2 it will be observed that the backs of the braces *e* are caused to extend from the rake-head flush with the top edge thereof, whereby the back of the head of the rake may be used for smoothing the soil after being raked, or crushing clods, as is common in the use of rakes. In Fig. 3 the braces *e e* are formed upon the fork, instead of being arranged as they are in connection with the rake-head, and are caused to extend upward and rearward, as seen in the middle and right-hand views of Fig. 3, to cause them to serve as guards and to strengthen the fork-head. The teeth are now formed by cutting the main portion of the blank as indicated by the dotted lines transversely traversing the same, when the embryonic teeth are drawn out, shaped, and pointed, as shown.

I am aware that it is not broadly new to make a rake of an integral piece of metal by cutting, bending, and drawing out the shank portion, and cutting the portion for the teeth transversely, and drawing out, shaping, and pointing them, as shown in patents to Beebe, No. 227,473, dated May 11, 1880, and Hamblin, No. 227,521, dated May 11, 1880, the essential feature of my invention consisting in the formation of the blade or teeth and the braces from an angle-iron blank.

Having thus fully described my invention, I claim and desire to secure by Letters Patent—

1. The improvement in the manufacture of garden rakes or forks which consists in cutting or forming a right-angled blank, the teeth being formed in one arm by cutting, drawing out, and pointing the same, and the shanks and tang being formed in the other arm of the blank by cutting, bending, and welding the parts, as and for the purpose set forth.

2. The improvement in the manufacture of garden or agricultural rakes and forks which consists in forming a blank, A, as shown essentially in Fig. 1, cutting a piece out of the middle of its right-angled portion A', cutting it a short distance from each side of said middle cut to its ends, or vice versa, bending and drawing out the strips or bars thus formed in the part A' to form the shanks and tang. and cutting the main portion transversely, drawing out, shaping, and pointing its teeth, as set forth.

In testimony whereof I affix my signature in presence of two witnesses.

WILLIAM W. KNOWLTON.

Witnesses:
R. W. CULVIN,
L. K. SHAYLOR.